United States Patent Office 2,897,136
Patented July 28, 1959

2,897,136
CATALYTIC CRACKING PROCESS USING A CATALYST WHOSE CARBON FACTOR HAS BEEN IMPROVED

William A. Pardee, Fox Chapel, Pa., assignor to Gulf Research & Development Company, Pittsburgh, Pa., a corporation of Delaware No Drawing. Application December 29, 1953
Serial No. 401,071
16 Claims. (Cl. 208—119)

This invention relates to the conversion of hydrocarbons and particularly to a method of improving the carbon factor of cracking catalysts which have lost activity and sensitivity through extended use.

In the catalytic cracking of hydrocarbons, high-boiling point hydrocarbons such as gas-oils, reduced crudes, and heavy naphthas are passed in contact with catalysts at an elevated temperature of approximately 800° to 1100° F. Processes for obtaining the desired contact between the catalyst and hydrocarbons, all of which are well known, are fixed bed, moving bed, fluid bed, and slurry type operations. The catalysts ordinarily used in cracking processes are composits of metal oxides, and most frequently are composites of silica with a difficultly reducible metal oxide such as alumina, beryllia, zirconia, magnesia, titania and the like.

In cracking processes the high-boiling point hydrocarbons are converted principally to hydrocarbons of lower boiling point suitable for use as gasoline, but also to gas and coke. The coke is deposited on the surface of the catalyst particles and seriously impairs the activity of the catalyst. Periodically the catalyst is regenerated by burning the coke deposited in the cracking process from its surface. In the fixed bed process, regeneration is accomplished by periodically stopping the flow of hydrocarbons through the catalyst bed, then passing air through the catalyst bed to burn the deposited carbon, after which the hydrocarbons are again passed over the catalyst. In the fluid bed and moving bed processes, the catalyst is continually withdrawn from the reactor in which the cracking occurs, transferred to a regenerator for burning of the coke deposited on its surface, and returned to the reactor.

While the regeneration of the catalyst by combustion of the carbonaceous deposits overcomes the temporary loss in activity of the catalyst resulting from coke formation, continued use of the catalyst frequently results in a gradual loss of selectivity which cannot be restored by the usual regeneration. The loss in selectivity is believed to be caused in part by the deposition of metals acting as catalyst poisons on the surface of the catalyst. The increasing use of less desirable crudes and deeper cuts into crudes as charge stocks in catalytic cracking operations has resulted in higher content of metals, notably vanadium, nickel, and iron, in the charge stock, and increased contamination of the catalysts with the metals. Loss in selectivity of catalysts may be expected to become more and more serious as less desirable charge stocks are employed.

A reduction in the selectivity of the catalyst increases the formation of coke and gas during the cracking, thereby causing a lower yield of hydrocarbons in the desired gasoline boiling range. In addition, the increased formation of coke makes it necessary to burn larger amounts of carbon in the regeneration of the catalyst. Since the capacity of many cracking units is limited by the carbon burn-off capacity of the unit, an increase in the formation of coke not only causes a lower yield but also a lower capacity for the cracking unit. The tendency of a catalyst to make coke is measured by the "carbon factor," which is the ratio of the coke produced by the catalyst under consideration to the coke produced by a standard fresh synthetic silica-alumina catalyst.

This invention resides in the treatment of used cracking catalysts with one or more volatile chlorides of metals which are not poisons to the catalyst to improve the carbor factor of the catalyst. In a preferred form of this invention the catalyst is treated with vapors of one or more chlorides of metals constituting an essential part of the original fresh cracking catalyst.

The chlorides that may be used in the process of this invention are the chlorides of metals that do not poison the catalyst and are sufficiently volatile to allow the treatment of the catalyst with vapors of the chloride at temperatures which will not harm the catalyst. Typical chlorides suitable for treatment of the catalysts according to this invention are those of aluminum, beryllium, titanium, zirconium, and boron, and those chlorides may be used either alone or in mixtures. Preferred treating agents are the chlorides of metals which are a component of the original fresh catalyst. Since many of the common commercial cracking catalysts are composites of silica with the oxides of one or more metals from the group listed above, it may be desirable to treat the catalyst with a mixture of silicon tetrachloride and a chloride of the other metals present in the catalyst in a ratio of silicon to the other metals corresponding approximately to the ratio in the original fresh catalyst.

The amount of metal chloride used in the treatment of the catalyst may very widely. For example, the weight ratio of catalyst to metal chloride may range from as low as about three to as high as about fifty. If larger amounts of metal chloride are employed, for example a catalyst to aluminum chloride ratio of 1.9 to 1, an adverse effect on the surface area of a silica-alumina catalyst results. However, experimental data have shown very little difference on the effect on the catalyst between catalyst to aluminum chloride ratios of 3.2 to 1 and 23 to 1. A catalyst to metal chloride ratio of approximately 20 to 1 is preferred in order to avoid adverse effects on the surface area, reduce the cost of the reagent employed, and at the same time, provide sufficient metal chloride vapors to insure effective treatment of the catalyst to reduce the carbon factor.

The catalysts are treated according to this invention by passing vapors of the metal chloride at an elevated temperature in contact with the catalyst. This may be accomplished, for example, by heating the metal chloride in a suitable vessel and passing a carrier gas, preferably an inert gas such as nitrogen, through the hot metal chloride and then directing the liberated vapors of the metal chloride through a bed of the catalyst. Any apparatus which will liberate vapors of the metal chloride in quantities sufficient for effective treatment may be employed.

The temperature of treatment of the catalyst should be sufficiently high to prevent condensation of the metal chloride, but should not be high enough to harm the catalyst. In general, the upper limit of the temperature will be determined by the maximum permissible temperature for regeneration of the catalyst while the minimum temperature will be determined by the lowest temperature at which sufficient vapors for effective treatment of the catalyst will be liberated from the metal chloride. Thus, the temperature of treatment of the catalyst will range from about 200° to about 1200° F.

After passing the vapors of the metal chloride in contact with the catalyst, it is desirable to calcine the catalyst to remove metal chloride deposited as such on its surface. In the usual commercial operations in which a catalyst passes through alternate regeneration and reaction stages and both of those stages are at elevated temperatures, calcination following the treatment with the metal chloride will not be necessary. Actually, the calcination amounts to little more than purging of metal chloride vapors from the apparatus.

Catalysts may be treated according to this invention either in place in the cracking or regeneration equipment or by removing them from the system. If the catalyst is treated in place, it is preferred that the treatment be made either during or following the regeneration step. In most catalytic cracking processes the regenerated catalyst acts as a source of heat for the cracking reaction. In those processes the treatment of the catalyst according to this invention should be at a temperature which will allow the catalyst to continue to serve as a source of heat.

In the catalytic cracking of hydrocarbons in a fixed bed process the catalyst remains in place in a reactor and hydrocarbons to be cracked are passed through the bed of catalyst at temperatures, pressures and flow rates suitable for cracking for a predetermined period after which the catalyst is purged of volatile hydrocarbons. An oxygen-containing gas is then passed through the catalyst bed to oxidize the carbon and thereby regenerate the catalyst to put it in condition for another cracking period. The vapors of metal chloride can be passed over the catalyst either during or at the end of the regeneration period. Similarly, in slurry, moving bed and fluid bed processes, in which the catalyst is separated from the hydrocarbons being cracked and delivered to a separate vessel for regeneration, the treatment with metal chloride vapors may be performed in the regeneration vessel. It is preferred, however, to provide a separate period during which the vapors of metal chloride are passed in contact with the catalyst in order to obtain most effective treatment by the process of this invention.

The improvement in the carbon factor of the catalysts which have been treated according to this invention is illustrated by the following examples:

EXAMPLE 1

A finely ground "equilibrium" synthetic silica-alumina catalyst, containing about 80 to 90 percent silica and substantially all of the remainder alumina, was permanently deactivated by use in a catalytic cracking process. The term "equilibrium" catalyst designates a catalyst that has been used in a cracking unit for an extended period of time during which time the activity of a catalyst in the unit is maintained substantially constant by the addition of fresh make-up catalyst. The catalyst was tested for activity in a standard test in which a Mid-Continent gas oil, having a boiling range of approximately 490° to 746° F., and a gravity of approximately 34.9° A.P.I. was passed downwardly at a carefully controlled rate through a fixed bed of the finely divided catalyst, which had been conditioned by heating in a stream of air at 1050° F. The temperature of the catalyst bed was maintained at 920° F. during the test. The activity of the catalyst is determined by the conversion of the gas oil to lower boiling hydrocarbons, gas and coke. The carbon factor is the ratio of the coke formed by the catalyst under consideration to the coke formed by a standard active synthetic silica-alumina catalyst at the same conversion rate. Separate activity tests were made for cracking periods of 60 minutes and 20 minutes.

EXAMPLE 2

A portion of the synthetic silica-alumina catalyst described in Example 1 was treated with vapors of aluminum chloride which were obtained by passing nitrogen through aluminum chloride heated to a temperature of 1000° F. The ratio of catalyst to aluminum chloride vapors was 23.1 to 1. After the treatment with the vapors of aluminum chloride, the catalyst was conditioned by passing dry air at a temperature of 1000° F. over the catalyst. The conditioned catalyst was tested for activity by the standard activity test described in Example 1, and the carbon factor determined.

EXAMPLE 3

A natural "equilibrium" catalyst comprising an acid activated halloysite available commercially as Filtrol SR and produced by the Filtrol Corporation of Los Angeles, California, was deactivated by use in the conversion of heavy charge stocks containing metallic poisons. This catalyst was then tested for activity by the standard activity test described in Example 1.

EXAMPLE 4

A portion of the natural "equilibrium" catalyst described in Example 3 was treated according to this invention by passing vapors of aluminum chloride over its surface at a temperature of 1000° F. The ratio of catalyst to aluminum chloride was 20.8 to 1. The treated catalyst was tested for activity according to the standard activity test described in Example 1.

The effects of the treatment of the catalysts in Examples 2 and 4 on the metals content and catalytic properties of the catalysts of Examples 1 and 3 are illustrated in Tables I and II, respectively.

Table I.—$AlCl_3$ treatment of cracking catalyst

[Temp.=1000° F. Nitrogen=40–80 liters/hr.]

| Example | 1 | 2 | 3 | 4 |
|---|---|---|---|---|
| Catalyst: $AlCl_3$ ratio [1] | | 23.1:1 | | 20.8:1 |
| Product: Analyses, weight percent— | | | | |
| Fe | 0.15 | 0.15 | 0.32 | 0.26 |
| V | 0.056 | 0.052 | 0.176 | 0.139 |
| Ni | 0.018 | 0.018 | 0.044 | 0.034 |
| Na | 0.10 | .10 | 0.22 | 0.23 |

[1] Weight catalyst/($AlCl_3$ charge—pot residue).

The mechanism by which the carbon factor of the catalyst is improved by treating according to this invention is not fully known or understood. It was believed that the permanent deactivation was caused by the presence of metallic poisons on the surface of the catalyst and that the metal in the poison would replace the metal in the metal chloride vapors and leave the oxide of the metal present in the metal chloride reagent on the surface of the catalyst. However, as illustrated in Table I, the concentration of the metal poisons in the synthetic catalyst is not altered appreciably by treatment according to this invention. A possible explanation of the cause of the improvement in the carbon factor is that treatment according to this invention either results in removal of poison metals, as in the treatment of acid activated clays, or in the deposition of some of the metal of the metal chloride which covers the metal poisons and prevents their coming in contact with the hydrocarbons being cracked.

Table II.—$AlCl_3$ treatment metal poisoned cracking catalysts

| Example | 1 Untreated | 2 $AlCl_3$ treated | 3 Untreated | 4 $AlCl_3$ treated |
|---|---|---|---|---|
| $AlCl_3$ treatment, 1000° F., catalyst:$AlCl_3$ (wt. ratio) | | 23.1:1 | | 20.8:1 |
| Catalytic activity tests: | | | | |
| 60-minute test— | | | | |
| Conversion | 29.5 | 26.6 | 19.2 | 19.0 |
| Coke | .70 | .50 | .54 | .47 |
| Carbon factor | 1.46 | 1.39 | 3.19 | 2.85 |
| 20-minute test— | | | | |
| Conversion | 36.43 | 35.0 | 26.4 | 26.5 |
| Coke | 1.21 | .93 | 1.0 | .80 |
| Carbon factor | 1.23 | 1.03 | 1.86 | 1.48 |
| 3-minute test— | | | | |
| Conversion | 52.6 | 56.5 | 45.7 | 46.9 |
| Coke | 3.10 | 2.43 | 3.13 | 1.99 |
| Carbon factor | 0.82 | 0.59 | 0.96 | 0.61 |

The results set forth in Table II for the "3 Minute Test" are obtained by extrapolation of the experimental results for the "60 Minute Test" and the "20 Minute Test" according to an established correlation. Operation of commercial cracking units ordinarily corresponds to a cracking period of approximately 7 minutes. It will be noted that the carbon factor is reduced approximately 25 percent for periods of less than 20 minutes. In some instances the carbon factor of the used or "equilibrium" catalyst is less than one, but even in those instances treatment according to this invention will result in a further substantial reduction in the carbon factor. The improvement of the carbon factor is obtained when either synthetic or naturally occurring catalysts are treated according to this invention, even though the effect of the treatment on the concentration of metal poisons in the two types of catalysts differs.

I claim:

1. A process for the improvement of the carbon factor of a cracking catalyst which has lost selectivity through extended use, said cracking catalyst comprising a composite of silica and an oxide of a metal selected from the group consisting of aluminum, boron, zirconium, beryllium, titanium and mixtures thereof, comprising passing a gas consisting essentially of vapors of a chloride of at least one of said metals other than silicon present in the catalyst derived from a source external of the catalyst at an elevated temperature in the range of 200° to 1200° F. in contact with the catalyst and thereafter purging the catalyst of metal chlorides.

2. A process as set forth in claim 1 in which the weight ratio of the catalyst to the metal chloride passed in contact therewith is in the range of 3:1 to 50:1.

3. A process for the improvement of the selectivity of a silica-alumina cracking catalyst which has lost part of its selectivity through use in a hydrocarbon cracking process comprising passing a gas consisting essentially of vapors of aluminum chloride derived from a source external of the catalyst at an effective temperature in the range of 200° to 1200° F. in contact with the catalyst and calcining the catalyst after contact with the vapors of aluminum chloride to remove aluminum chloride from the surface of the catalyst.

4. A process as set forth in claim 3 in which the weight ratio of the catalyst to the aluminum chloride passed in contact therewith is in the range of 3:1 to 50:1.

5. A process as set forth in claim 3 in which the silica-alumina catalyst is an activated clay.

6. A process as set forth in claim 3 in which the silica-alumina catalyst is a synthetic composite of silica and alumina.

7. In a process for the cracking of hydrocarbons in which hydrocarbons are passed in contact with a cracking catalyst consisting essentially of a composite of silica and an oxide of a metal selected from the group consisting of aluminum, boron, zirconium, beryllium, titanium, and mixtures thereof at an elevated temperature and for a period sufficient to crack the hydrocarbons, after which the catalyst is regenerated by burning coke deposited on the catalyst during the cracking period, and then hydrocarbons are again passed in contact with the catalyst, the improvement comprising passing a gas consisting essentially of vapors of a chloride of at least one of said metals, other than silicon present in the catalyst derived from a source external of the catalyst at an elevated temperature adapted to prevent condensation of the metal chloride on the catalyst and in the range of 200° to 1200° F. between periods of contact of the catalyst with the hydrocarbons to improve the carbon factor of the catalyst, the ratio, by weight, of catalyst to the chloride passed in contact therewith being in the range from 3:1 to 50:1.

8. A process for the improvement of the carbon factor of a racking catalyst which has lost selectivity through extended use, said cracking catalyst consisting essentially of a composite of silica and an oxide of a metal selected from the group consisting of aluminum, boron, zirconium, beryllium, titanium, and mixtures thereof, comprising passing a gas consisting essentially of vapors of a chloride of at least one of said metals other than silicon present in the catalyst derived from a source external of the catalyst at an elevated temperature in the range of 200° to 1200° F. in contact with the catalyst, the ratio, by weight, of catalyst to the chloride passed in contact therewith being in the range of 3:1 to 50:1, and calcining the catalyst after conatct with the vapors of the chloride to remove metal chloride from the surface of the catalyst.

9. A process as set forth in claim 8 in which the metal is zirconium.

10. A process as set forth in claim 8 in which the metal is boron.

11. A process as set forth in claim 8 in which the metal is titanium.

12. A process as set forth in claim 8 in which the metal is beryllium.

13. A process for the improvement of the carbon factor of a cracking catalyst which has lost selectivity through extended use, said cracking catalyst comprising a composite of silica and an oxide of a metal selected from the group consisting of aluminum, boron, zirconium, beryllium, titanium, and mixtures thereof, comprising passing gases consisting essentially of vapors of silicon tetrachloride and a chloride of at least one of said metals other than silicon present in the catalyst derived from a source external of the catalyst in contact with the catalyst at an elevated temperature in the range of 200° to 1200° F., the ratio, by weight, of the catalyst to the metal chloride being in the range of 3:1 to 50:1, and thereafter purging the catalyst of metal chlorides.

14. A process for the improvement of the carbon factor of a cracking catalyst which has lost selectivity through extended use, said cracking catalyst comprising a composite of silica and an oxide of a metal selected from the group consisting of aluminum, boron, zirconium, beryllium, titanium, and mixtures thereof, comprising passing an inert gas in contact with a chloride of at least one of said metals other than silicon present in the catalyst at an elevated temperature to introduce vapors of the chloride into the inert gas, the ratio, by weight, of the catalyst to the metal chloride being in the range of 3:1 to 50:1, and passing the mixture of the inert gas and vapors of the metal chloride in contact with the catalyst at an elevated temperature in the range of 200° to 1200° F. adapted to prevent condensation of the metal chloride in the catalyst.

15. In a catalytic cracking process in which a bed of a cracking catalyst comprising a composite of silica and at least one oxide selected from the group consisting of aluminum, boron, zirconium, beryllium, titanium, and mixtures thereof is maintained in a reaction vessel, hydrocarbons are passed through the reaction vessel in contact with the catalyst at a temperature in the range of 800° to 1000° F. to crack the hydrocarbons to more volatile fractions, thereafter the reaction vessel is purged of hydrocarbons and an oxygen-containing gas is passed through the bed of catalyst to burn carbonaceous deposits from the catalyst and thereby regenerate the catalyst, the improvement comprising after the regeneration of the catalyst passing a gas consisting essentially of vapors of a chloride of at least one of said metals other than silicon present in the catalyst derived from a source external of the catalyst in contact with the regenerated catalyst at a temperature in the range of 800° to 1000° F. adapted to prevent condensation of the metal chloride on the catalyst, the ratio, by weight, of the catalyst to the metal chloride being in the range of 3:1 to 50:1.

16. In a fluidized catalytic cracking process in which hydrocarbons are passed at a temperature of 800° to 1000° F. through a bed of a cracking catalyst comprising a composite of silica and an oxide of a metal selected from the group consisting of aluminum, boron, zirconium, beryllium, titanium, and mixtures thereof in a reactor whereby the hydrocarbons are cracked to more volatile hydrocarbon fractions, catalyst is withdrawn from the reactor and transferred to a regenerator in which an oxygen-containing gas is passed through a bed of the catalyst to burn carbonaceous deposits from the catalyst and thereby regenerate the catalyst, and catalyst is withdrawn from the regenerator and returned to the reactor at a temperature higher than the temperature in the reactor, the improvement comprising passing a gas consisting essentially of vapors of a chloride of at least one of said metals other than silicon present in the catalyst derived from a source external of the catalyst in contact with the regenerated catalyst, the ratio, by weight, of the catalyst to the metal chloride being in the range of 3:1 to 50:1, and returning the thus treated catalyst to the reactor at a temperature higher than the temperature in the reactor whereby the metal chloride is purged from the catalyst.

References Cited in the file of this patent

UNITED STATES PATENTS

| | | |
|---|---|---|
| 2,208,362 | Engel | July 16, 1940 |
| 2,311,713 | Thomas et al. | Feb. 23, 1943 |
| 2,406,477 | Solomon et al. | Aug. 27, 1946 |
| 2,480,627 | Snyder | Aug. 30, 1949 |
| 2,481,253 | Bodkin | Sept. 6, 1949 |
| 2,488,718 | Forrester | Nov. 22, 1949 |
| 2,506,923 | Hoekstra | May 9, 1950 |
| 2,551,580 | Bond | May 8, 1951 |
| 2,576,653 | Thomas | Nov. 27, 1951 |
| 2,582,254 | Hunter | Jan. 15, 1952 |
| 2,638,453 | Starr | May 12, 1953 |

UNITED STATES PATENT OFFICE
CERTIFICATE OF CORRECTION

Patent No. 2,897,136                                                    July 28, 1959

William A. Pardee

It is hereby certified that error appears in the printed specification of the above numbered patent requiring correction and that the said Letters Patent should read as corrected below.

Column 1, line 24, for "composits" read -- composites --; column 2, lines 15 and 16, for "accordinng" read -- according --; line 29, for "very" read -- vary --; column 5, line 74, for "racking" read -- cracking --; column 8, line 10, list of references cited, for "Snyder" read -- Bodkin --; line 11, for "Bodkin" read -- Snyder --.

Signed and sealed this 8th day of December 1959.

(SEAL)
Attest:

KARL H. AXLINE
Attesting Officer

ROBERT C. WATSON
Commissioner of Patents